United States Patent
Petersen et al.

(10) Patent No.: US 9,894,393 B2
(45) Date of Patent: Feb. 13, 2018

(54) VIDEO ENCODING FOR REDUCED STREAMING LATENCY

(71) Applicant: GoPro, Inc., San Mateo, CA (US)

(72) Inventors: Mark Petersen, San Diego, CA (US); Peter Tran, San Diego, CA (US); Jeffrey S. Youel, Rancho Santa Fe, CA (US)

(73) Assignee: GoPro, Inc., San Mateo, CA (US)

( * ) Notice: Subject to any disclaimer, the term of this patent is extended or adjusted under 35 U.S.C. 154(b) by 52 days.

(21) Appl. No.: 14/841,431

(22) Filed: Aug. 31, 2015

(65) Prior Publication Data

US 2017/0064344 A1 Mar. 2, 2017

(51) Int. Cl.
*H04N 21/2385* (2011.01)
*H04N 21/2387* (2011.01)
(Continued)

(52) U.S. Cl.
CPC ......... *H04N 21/2385* (2013.01); *G11B 27/10* (2013.01); *H04N 19/107* (2014.11); *H04N 19/44* (2014.11); *H04N 21/2387* (2013.01); *H04N 21/4223* (2013.01); *H04N 21/4382* (2013.01); *H04N 21/4385* (2013.01); *H04N 21/44004* (2013.01); *H04N 21/6336* (2013.01);
(Continued)

(58) Field of Classification Search
None
See application file for complete search history.

(56) References Cited

U.S. PATENT DOCUMENTS

| 7,222,356 B1 * | 5/2007 | Yonezawa | H04N 7/181 348/14.02 |
|---|---|---|---|
| 7,483,618 B1 | 1/2009 | Edwards | |

(Continued)

FOREIGN PATENT DOCUMENTS

WO 2009040538 4/2009

OTHER PUBLICATIONS

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

(Continued)

*Primary Examiner* — Michael Telan
(74) *Attorney, Agent, or Firm* — Sheppard Mullin Richter & Hampton LLP

(57) ABSTRACT

A client device requests a streaming video from a storage device, which encodes the video's frame in communication packets according to an encoding protocol for transmission to the client. The client device decodes the communication packets to obtain frame segments and a frame marking header indicating a boundary of the video frame relative to other video frames in the video. The communication packets may also include other segment headers indicating a relative ordering of corresponding frame segments. The client device determines, based on the frame marking header, whether a sufficient number of communication packets have been received to render a video frame. In response to determining that the sufficient number of communication packets has been received, the client device assembles the video frame from the frame segments corresponding to the video frame and presents at least a portion of the video by rendering the assembled video frame.

8 Claims, 7 Drawing Sheets

(51) Int. Cl.

| | | |
|---|---|---|
| H04N 21/845 | (2011.01) | |
| G11B 27/10 | (2006.01) | |
| H04N 21/438 | (2011.01) | |
| H04N 19/44 | (2014.01) | |
| H04N 19/107 | (2014.01) | |
| H04N 21/4223 | (2011.01) | |
| H04N 21/4385 | (2011.01) | |
| H04N 21/6336 | (2011.01) | |
| H04N 21/44 | (2011.01) | |

(52) U.S. Cl.
    CPC ....... *H04N 21/845* (2013.01); *H04N 21/8456* (2013.01)

(56) References Cited

U.S. PATENT DOCUMENTS

| | | | |
|---|---|---|---|
| 7,681,223 | B2 | 3/2010 | Takahashi |
| 8,446,433 | B1 | 5/2013 | Mallet |
| 8,611,422 | B1 | 12/2013 | Yagnik |
| 8,718,447 | B2 | 5/2014 | Yang |
| 8,763,023 | B1 | 6/2014 | Goetz |
| 9,077,956 | B1 | 7/2015 | Morgan |
| 9,253,533 | B1 | 2/2016 | Morgan |
| 2004/0128317 | A1 | 7/2004 | Sull |
| 2005/0025454 | A1 | 2/2005 | Nakamura |
| 2005/0060365 | A1 | 3/2005 | Robinson |
| 2006/0156219 | A1 | 7/2006 | Haot |
| 2007/0002946 | A1 | 1/2007 | Bouton |
| 2007/0106419 | A1 | 5/2007 | Rachamadugu |
| 2007/0168543 | A1 | 7/2007 | Krikorian |
| 2007/0204310 | A1 | 8/2007 | Hua |
| 2007/0230461 | A1* | 10/2007 | Singh ............... H04L 29/06027 370/389 |
| 2008/0044155 | A1 | 2/2008 | Kuspa |
| 2008/0123976 | A1 | 5/2008 | Coombs |
| 2008/0152297 | A1 | 6/2008 | Ubillos |
| 2008/0163283 | A1 | 7/2008 | Tan |
| 2008/0177706 | A1 | 7/2008 | Yuen |
| 2008/0253735 | A1 | 10/2008 | Kuspa |
| 2008/0313541 | A1 | 12/2008 | Shafton |
| 2009/0213270 | A1 | 8/2009 | Ismert |
| 2010/0086216 | A1 | 4/2010 | Lee |
| 2010/0104261 | A1 | 4/2010 | Liu |
| 2010/0183280 | A1 | 7/2010 | Beauregard |
| 2010/0231730 | A1 | 9/2010 | Ichikawa |
| 2010/0245626 | A1 | 9/2010 | Woycechowsky |
| 2010/0251295 | A1 | 9/2010 | Amento |
| 2010/0278504 | A1 | 11/2010 | Lyons |
| 2010/0278509 | A1 | 11/2010 | Nagano |
| 2010/0281375 | A1 | 11/2010 | Pendergast |
| 2010/0281386 | A1 | 11/2010 | Lyons |
| 2010/0318660 | A1 | 12/2010 | Balsubramanian |
| 2011/0075990 | A1 | 3/2011 | Eyer |
| 2011/0093605 | A1 | 4/2011 | Choudhury |
| 2011/0093798 | A1 | 4/2011 | Shahraray |
| 2011/0206351 | A1 | 8/2011 | Givoly |
| 2011/0293250 | A1 | 12/2011 | Deever |
| 2012/0027381 | A1 | 2/2012 | Kataoka |
| 2012/0030029 | A1 | 2/2012 | Flinn |
| 2012/0057852 | A1 | 3/2012 | Devleeschouwer |
| 2012/0123780 | A1 | 5/2012 | Gao |
| 2012/0192225 | A1 | 7/2012 | Harwell |
| 2012/0198319 | A1 | 8/2012 | Agnoli |
| 2012/0311448 | A1 | 12/2012 | Achour |
| 2013/0041948 | A1 | 2/2013 | Tseng |
| 2013/0104177 | A1 | 4/2013 | Kwan |
| 2013/0136193 | A1* | 5/2013 | Hwang ............... H03M 13/05 375/240.27 |
| 2013/0151970 | A1 | 6/2013 | Achour |
| 2013/0166303 | A1 | 6/2013 | Chang |
| 2013/0185388 | A1 | 7/2013 | Mackie |
| 2013/0195429 | A1 | 8/2013 | Fay |
| 2013/0197967 | A1 | 8/2013 | Pinto |
| 2013/0208942 | A1 | 8/2013 | Davis |
| 2013/0222583 | A1 | 8/2013 | Earnshaw |
| 2013/0259399 | A1 | 10/2013 | Ho |
| 2013/0283301 | A1 | 10/2013 | Avedissian |
| 2013/0287214 | A1 | 10/2013 | Resch |
| 2013/0300939 | A1 | 11/2013 | Chou |
| 2013/0318443 | A1 | 11/2013 | Bachman |
| 2013/0343727 | A1 | 12/2013 | Rav-Acha |
| 2014/0072285 | A1 | 3/2014 | Shynar |
| 2014/0093164 | A1 | 4/2014 | Noorkami |
| 2014/0096002 | A1 | 4/2014 | Dey |
| 2014/0105573 | A1 | 4/2014 | Hanckmann |
| 2014/0161351 | A1 | 6/2014 | Yagnik |
| 2014/0165119 | A1 | 6/2014 | Liu |
| 2014/0169766 | A1 | 6/2014 | Yu |
| 2014/0212107 | A1 | 7/2014 | Saint-Jean |
| 2014/0219634 | A1 | 8/2014 | McIntosh |
| 2014/0226953 | A1 | 8/2014 | Hou |
| 2014/0232818 | A1 | 8/2014 | Carr |
| 2014/0245336 | A1 | 8/2014 | Lewis, II |
| 2014/0300644 | A1 | 10/2014 | Gillard |
| 2014/0328570 | A1 | 11/2014 | Cheng |
| 2014/0341527 | A1 | 11/2014 | Hurley |
| 2014/0341528 | A1 | 11/2014 | Mahate |
| 2014/0366052 | A1 | 12/2014 | Ives |
| 2015/0015680 | A1 | 1/2015 | Wang |
| 2015/0022355 | A1 | 1/2015 | Pham |
| 2015/0029089 | A1 | 1/2015 | Kim |
| 2015/0186073 | A1 | 7/2015 | Pacurariu |
| 2015/0281710 | A1 | 10/2015 | Sievert |
| 2015/0287435 | A1 | 10/2015 | Land |
| 2015/0318020 | A1 | 11/2015 | Pribula |
| 2015/0375117 | A1 | 12/2015 | Thompson |
| 2015/0382083 | A1 | 12/2015 | Chen |
| 2016/0005440 | A1 | 1/2016 | Gower |
| 2016/0026874 | A1 | 1/2016 | Hodulik |
| 2016/0027470 | A1 | 1/2016 | Newman |
| 2016/0027475 | A1 | 1/2016 | Hodulik |
| 2016/0029105 | A1 | 1/2016 | Newman |
| 2016/0055885 | A1 | 2/2016 | Hodulik |
| 2016/0225405 | A1 | 8/2016 | Matias |
| 2016/0225410 | A1 | 8/2016 | Lee |
| 2016/0234345 | A1 | 8/2016 | Roberts |
| 2016/0300594 | A1 | 10/2016 | Allen |
| 2016/0358603 | A1 | 12/2016 | Azam |
| 2016/0366330 | A1 | 12/2016 | Boliek |

OTHER PUBLICATIONS

FFmpeg, "Muxing," Doxygen, Jul. 20, 2014, 9 Pages, [online] [retrieved on Jul. 13, 2015] Retrieved from the internet <URL: https://www.ffmpeg.org/doxygen/2.3/structAVPacket.html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

PCT International Search Report and Written Opinion for PCT/US2015/023680, dated Oct. 6, 2015, 13 pages.

PCT International Written Opinion for PCT/US2015/041624, dated Dec. 17, 2015, 7 Pages.

PCT International Search Report for PCT/US15/41624 dated Nov. 4, 2015, 5 pages.

PCT International Search Report for PCT/US15/23680 dated Aug. 3, 2015, 4 pages.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 20 pages.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights Via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

(56) References Cited

OTHER PUBLICATIONS

Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al., Deep Compression: Compressing Deep Neural Networks with Pruning, Trained Quantization and Huffman Coding, International Conference on Learning Representations 2016, 14 pgs.
Ernoult, Emeric, "How to Triple Your YouTube Video Views with Facebook", SocialMediaExaminer.com, Nov. 26, 2012, 16 pages.

* cited by examiner

VIDEO ENCODING FOR REDUCED STREAMING LATENCY

BACKGROUND

Field of Art

This application relates in general to streaming video and in particular to encoding streaming video to reduce latency between streaming the video and beginning playback.

Description of the Related Art

High definition video, high frame rate video, or video that is both high definition and high frame rate (collectively referred to herein as "HDHF video") can consume a large amount of transmission bandwidth when transmitted or transferred. Accordingly, transmitting even a small number HFHF frames may take a noticeable amount of time (e.g., around a second).

When a video is streamed for viewing, the video player may buffer a minimum number of video frames. The minimum number of frames may correspond to a minimum amount of time (e.g., ten seconds) to prevent pauses in video playback due to momentary losses of connectivity. Typically, a video player buffers at least a full group of pictures before beginning playback. However, when streaming a HDHF video, the time to buffer the full group of pictures results in a noticeable delay before the video begins playing. Accordingly, present methods have noticeable latency when streaming HDHF videos.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION OF THE INVENTION

Figure 1:
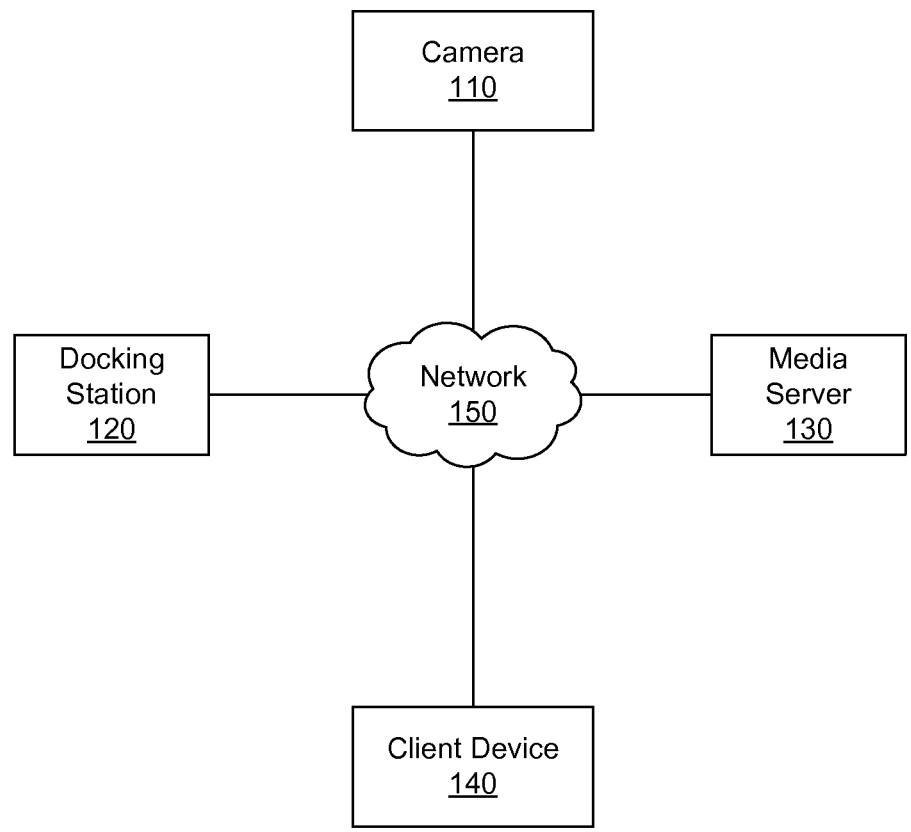
FIG. 1 illustrates a streaming environment for video capture and viewing, according to one example embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments include a method comprising steps for encoding and transmitting a video, a non-transitory computer-readable storage medium storing instructions that when executed cause a processor to perform steps to encode and transmit a video, and a system (e.g., a camera) for encoding and transmitting a video, where the system comprises the processor and the non-transitory computer-readable medium. The steps include receiving, from a client device, a request to stream the video for playback by the client device; accessing a video frame from video frames included in the video; segmenting the video frame into a plurality of frame segments; generating segment headers each indicating a sequence order of the frame segments, the segment headers comprising a frame marking header indicating a boundary of the video frame relative to other video frames in the video; generating communication packets each having a payload comprising one of the segment headers and a corresponding one of the frame segments, the communication packets comprising a communication packet with a payload comprising the frame marking header; and transmitting the communication packets to the client device for playback of the video frame, the client device rendering the video frame using the frame marking header.

Embodiments include a method comprising steps for decoding and presenting a video, a non-transitory computer-readable storage medium storing instructions that when executed cause a processor to perform steps to decode and present a video, and a system for decoding and presenting a video, where the system comprises the processor and the non-transitory computer-readable medium. The steps include receiving communication packets from a device storing the video; decoding the communication packets to obtain frame segments corresponding to one or more video frames of the video and segment headers each indicating a sequence order of the plurality of frame segments; identifying, from the segment headers, a frame marking header indicating a boundary of the video frame relative to other video frames in the video; determining, based on the frame marking header, whether a sufficient number of communication packets have been received to render a video frame; and in response to determining that the sufficient number of communication packets have been received: assembling the video frame from frame segments corresponding to the video frame, and presenting at least a portion of the video by rendering the assembled video frame.

Streaming Environment

FIG. 1 illustrates a streaming environment for video capture and viewing, according to one example embodiment. The environment includes devices including a camera 110, a docking station 120, a client device 140, and a media server 130 communicatively coupled by one or more networks 150. In alternative configurations, different and/or additional components may be included in the streaming environment 100. For example, one device functions as both a camera docking station 120 and a client device 140.

Although not shown in FIG. 1, the environment may include a plurality of any of the devices.

The camera 110 is a device capable of capturing media (e.g., video, images, audio, associated metadata). Media is a digital representation of information, typically aural or visual information. Videos are a sequence of image frames (also referred to as video frames) and may include audio synchronized to the image frames. The camera 110 can include a camera body having a camera lens on a surface of the camera body, various indicators on the surface of the camera body (e.g., LEDs, displays, and the like), various input mechanisms (such as buttons, switches, and touchscreen mechanisms), and electronics (e.g., imaging electronics, power electronics, metadata sensors) internal to the camera body for capturing images via the camera lens and/or performing other functions. A user uses the camera 110 to record or capture media in conjunction with associated metadata which the user can edit at a later time. A camera 110 may transmit or transfer a video to a client device 140 for presentation to user. Some cameras 110 may include a display for viewing videos stored on the camera or transmitted from another entity in the streaming environment. Such a camera 110 may perform some or all of the functions of a client device 140.

The docking station 120 stores media captured by a camera 110 communicatively coupled to the docking station 120 to facilitate handling of HDHF video. For example, the docking station 120 is a camera-specific intelligent device for communicatively coupling a camera, for example, a GOPRO HERO camera. The camera 110 can be coupled to the docking station 120 by wired means (e.g., a USB (universal serial bus) cable, an HDMI (high-definition multimedia interface) cable) or wireless means (e.g., Wi-Fi, Bluetooth, Bluetooth, 4G LTE (long term evolution)). The docking station 120 can access video data from the camera 110, and can transfer the accessed video data to the media server 130 via the network 150. For example, the docking station is coupled to the camera 110 through a camera interface (e.g., a communication bus, a connection cable) and is coupled to the network 150 through a network interface (e.g., a port, an antenna). The docking station 120 retrieves videos from the camera via the camera interface and then uploads the retrieved videos and metadata to the media server 130 though the network. The docking station 120 may transmit its stored videos to a client device 140 for presentation to the user.

The media server 130 receives and stores videos captured by the camera 110 to allow a user to access the videos at a later time. The media server 130 may receive videos via the network 150 from the camera 110 or a client device 140. For instance, a user may edit an uploaded video, view an uploaded or edited video, transfer a video, and the like through the media server 130. In some embodiments, the media server 130 may provide cloud services through one or more physical or virtual servers provided by a cloud computing service. For example, the media server 130 includes geographically dispersed servers as part of a content distribution network.

A user can access videos stored in a storage device (e.g., camera 110, docking station 120, or media server 130) through a client device 140. The client device 140 is any computing device capable of receiving user inputs as well as transmitting and/or receiving data via the network 150. In one embodiment, the client device 140 is a conventional computer system, such as a desktop or a laptop computer. Alternatively, the client device 140 may be a device having computer functionality, such as a smartphone, a tablet, a mobile telephone, a personal digital assistant (PDA), or another suitable device. One or more input devices associated with the client device 140 receive input from the user. For example, the client device 140 can include a touch-sensitive display, a keyboard, a trackpad, a mouse, a voice recognition system, and the like.

In one embodiment, the client device 140 executes an application allowing a user of the client device 140 to interact with a storage device. For example, a user can browse videos stored on the storage device and select one of the videos for viewing. In one embodiment, the client device 140 interacts with the storage device through an application programming interface (API) accessed by an application native to an operating system of the client device 140, such as IOS® or ANDROID™. In another embodiment, the client device 140 browses and requests videos through a web application provided by the media server 130.

When the client device 140 requests a video from the storage device, the storage device encodes the media in communication packets for transmission to the client device 140 via network 150. A transmission packet includes a frame segment containing a portion of a frame. The transmission packet also contains a segment header indicating the frame segment's relationship to other frame segments. A transmission packet may also include a frame marking header, which is additional metadata indicating how many communication packets contain a frame's video data.

The client device 140 receives and decodes communication packets transmitted from the storage device. The client device 140 uses the frame marking header to determine when the client device 140 has received sufficient communication packets to render to a frame. The client device 140 then renders the frame. This approach beneficially reduces latency by presenting a frame even if other frames in the group of pictures have not been completely received and/or decoded.

The camera 110, the docking station 120, the media server 130, and the client device 140 communicate with each other via the network 150, which may include any combination of local area and/or wide area networks, using both wired (e.g., T1, optical, cable, DSL) and/or wireless communication systems (e.g., WiFi, mobile). The network 150 may include intervening devices to route communications, or the network 150 may be directly established between two or more of the streaming environment's entities. For example, the network is a Bluetooth and/or WiFi connection established between a camera 110 and the client device 140. In one embodiment, the network 150 uses standard communications technologies and/or protocols. In some embodiments, all or some of the communication links of the network 150 may be encrypted using any suitable technique or techniques.

Example Camera Configuration

Figure 2:
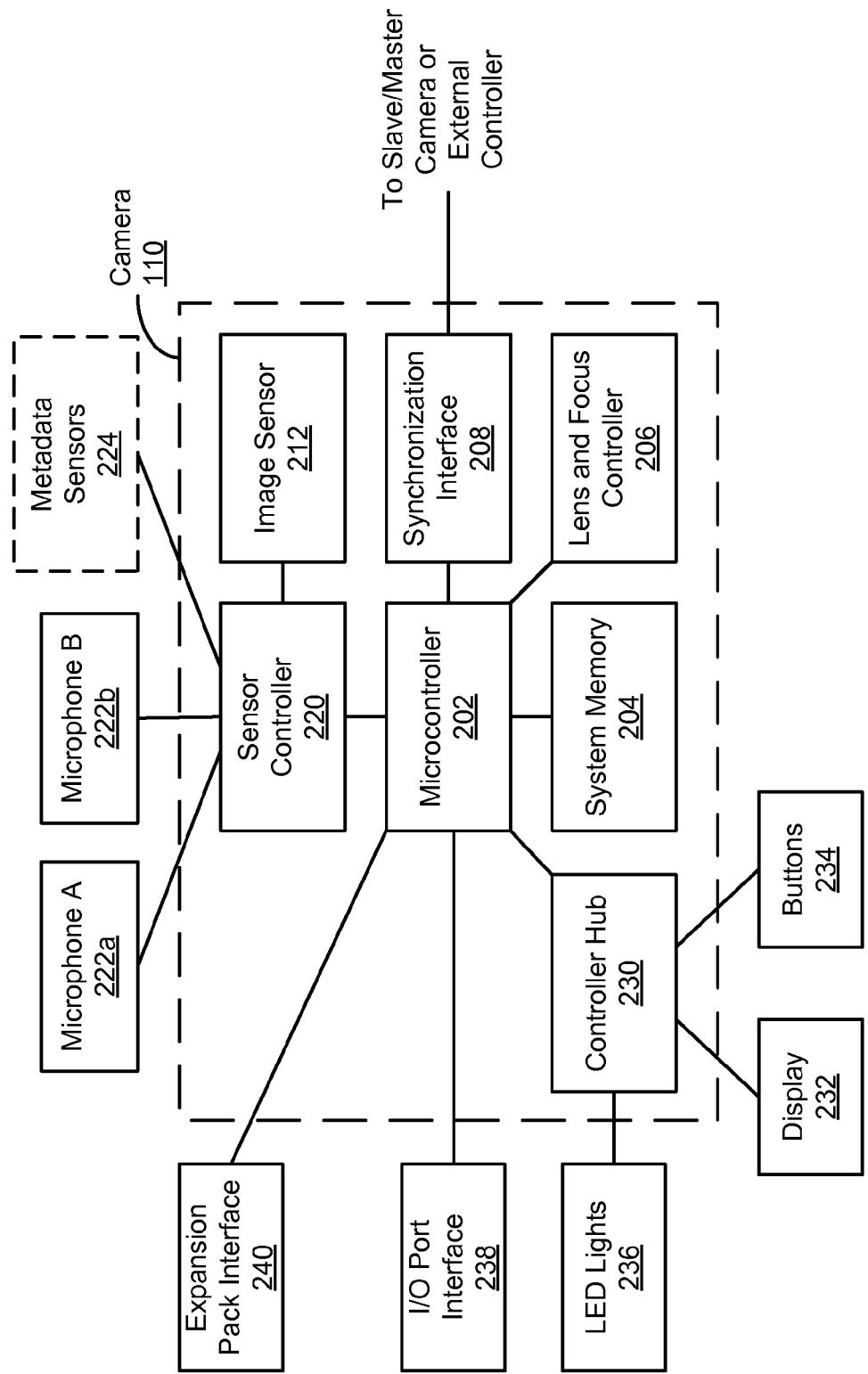
FIG. 2 is a block diagram illustrating a camera system, according to one example embodiment.

FIG. 2 is a block diagram illustrating a camera system, according to one embodiment. The camera 110 includes one or more microcontrollers 202 (such as microprocessors) that control the operation and functionality of the camera 110. A lens and focus controller 206 is configured to control the operation and configuration of the camera lens. A system memory 204 is configured to store executable computer instructions that, when executed by the microcontroller 202, perform the camera functionalities described herein. The microcontroller 202 is a processing unit and may be augmented by or substituted with a processor. A synchronization interface 208 is configured to synchronize the camera 110 with other cameras or with other external devices, such as a remote control, a second camera 110, a camera docking station 120, a smartphone or other client device 140, or a media server 130.

A controller hub 230 transmits and receives information from various I/O components. In one embodiment, the controller hub 230 interfaces with LED lights 236, a display 232, buttons 234, microphones such as microphones 222a and 222b, speakers, and the like.

A sensor controller 220 receives image or video input from an image sensor 212. The sensor controller 220 receives audio inputs from one or more microphones, such as microphone 222a and microphone 222b. The sensor controller 220 may be coupled to one or more metadata sensors 224 such as an accelerometer, a gyroscope, a magnetometer, a global positioning system (GPS) sensor, or an altimeter, for example. A metadata sensor 224 collects data measuring the environment and aspect in which the video is captured. For example, the metadata sensors include an accelerometer, which collects motion data, comprising velocity and/or acceleration vectors representative of motion of the camera 110; a gyroscope, which provides orientation data describing the orientation of the camera 110; a GPS sensor, which provides GPS coordinates identifying the location of the camera 110; and an altimeter, which measures the altitude of the camera 110.

Additional components connected to the microcontroller 202 include an I/O port interface 238 and an expansion pack interface 240. The I/O port interface 238 may facilitate the receiving or transmitting video or audio information through an I/O port. Examples of I/O ports or interfaces include USB ports, HDMI ports, Ethernet ports, audio ports, and the like. Furthermore, embodiments of the I/O port interface 238 may include wireless ports that can accommodate wireless connections. Examples of wireless ports include Bluetooth, Wireless USB, Near Field Communication (NFC), and the like. The I/O port interface may transmit communication packets containing portions of encoded video frames to a client device 140. The expansion pack interface 240 is configured to interface with camera add-ons and removable expansion packs, such as a display module, an extra battery module, a wireless module, and the like.

Example Communication Packets

Figure 3:
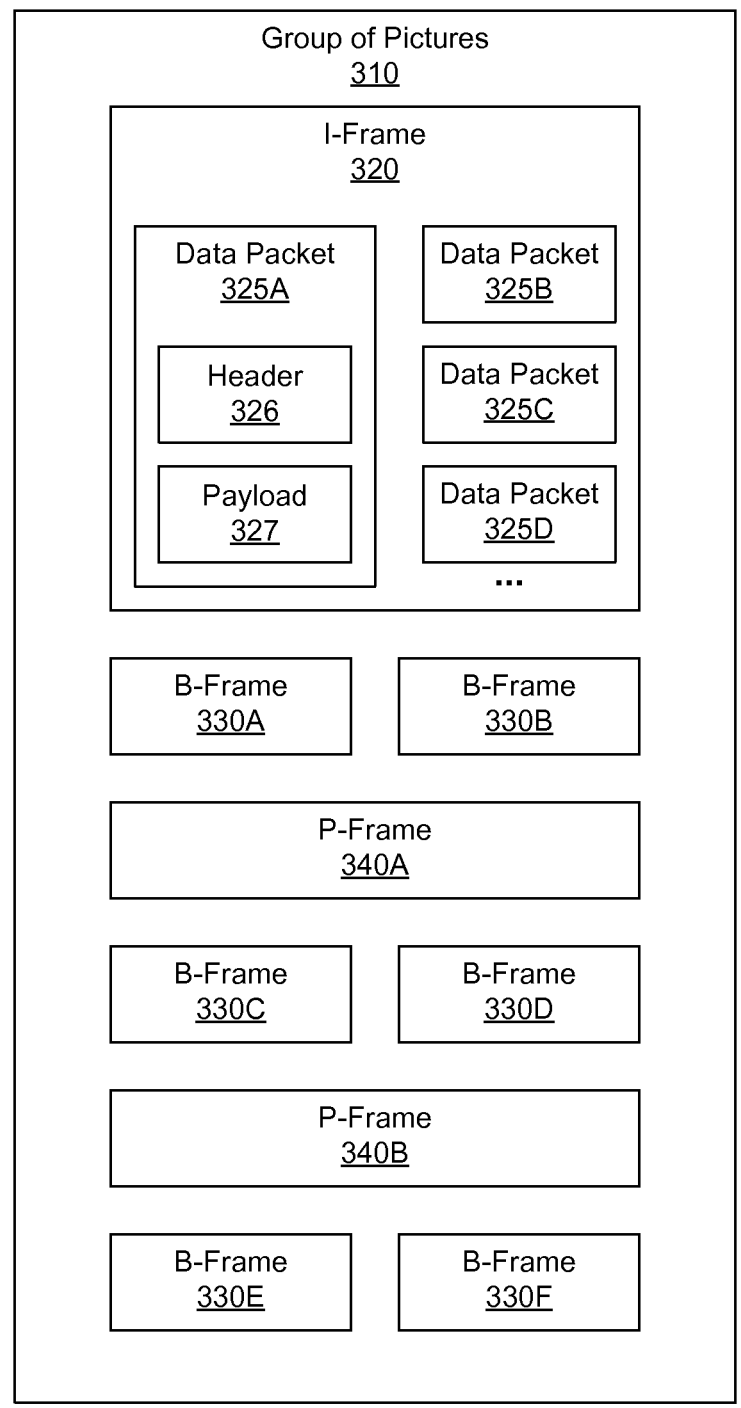
FIG. 3 is a conceptual diagram illustrating data packets used to transmit a video file, according to one example embodiment.

FIG. 3 is a conceptual diagram illustrating data packets used to transmit a video file 300, according to one example embodiment. The video file 300 includes one or more groups of pictures 310. A group of pictures 310 includes at least one intra-coded frame 320 (I-frame) and inter coded frames such as predictive frames 340 (P-frames) or a bi-predictive frames 330 (B-frames). A group of pictures 310 typically includes a regular sequence of frame types. In the example group of pictures, the order of video frames is I-frame 320, B-frame 330A, B-frame 330B, P-frame 340A, B-frame 330C, B-frame 330D, P-frame 340B, B-frame 330E, and B-frame 330F.

I-frames 320 contain image data for reconstruction without reference to another video frame. P-frames 340 contain at least some image data specified relative to image data of another video frame. For example, a P-frame 340 indicates that some pixels are the same as a previous I-frame 320, and that some pixels are the same as a shifted set of pixels from the previous I-frame 320. B-frames 330 contain at least some image data specified relative to at least two video frames (typically a preceding video frame and a following video frame).

When transmitted, the image data of I-frame 320 is segmented into one or more data packets 325 (also referred to as communication packets). As illustrated, the I-frame 320 includes at least data packets 325A-325D. Although not illustrated, the B-frames 330 and P-frames are also segmented into data packets 325. A data packet (such as 325A) contains a header 326 and a payload 327. Example data packets include a user datagram protocol (UDP) packet and a transmission control protocol (TCP) packet.

The header 326 describes properties of the data packet 325 such as routing information (e.g., origin and destination addresses), length (e.g., number of bits in the payload 327), options, or a transmission verification mechanism (e.g., a checksum).

The payload 327 contains data transmitted in the data packet 325. For a data packet 325 carrying video frame data, the payload 327 includes a frame segment and optionally a segment header. The frame segment comprises a portion of a video frame's image data. For example, in I-frame 320, the frame segment specifies color channel gray scale values for pixels in one or more rows, columns, or regions of the video frame. The segment header contains sequencing information indicating the sequence order of the frame segment's image data relative to image data in other data packets 325. For example, the segment header indicates a frame index of the frame corresponding to the frame segment and/or an image data index or range (e.g., by row, column, region, pixel, or bit) indicating how to combine the frame segment's image data with other image data from other frame segments corresponding to the frame. As another example, the segment header indicates an index of the frame segment relative to other frame segments containing a frame's image data. Alternatively or additionally, the frame segment includes image data indexes to enable reconstruction of the frame without the segment header.

In some embodiments, the segment header may include a frame marking header, which facilitates separation of data packets 325 corresponding to different frames. For example, the frame marking header includes a boundary flag that marks a data packet 325 as containing the first or last frame segment in a video frame ("a frame boundary segment"). Generating the segment headers may comprise (1) identifying a frame boundary segment immediately preceding or immediately following a frame segment in another group of pictures, and (2) generating the frame marking header including a flag identifying the frame boundary segment. As another example, the frame marking header indicates a number of data packets 325 containing a video frame's frame segments. The frame marking header facilitates determination of whether all the data packets 325 containing a video frame's image data have been received.

Example Video Encoder

Figure 4:
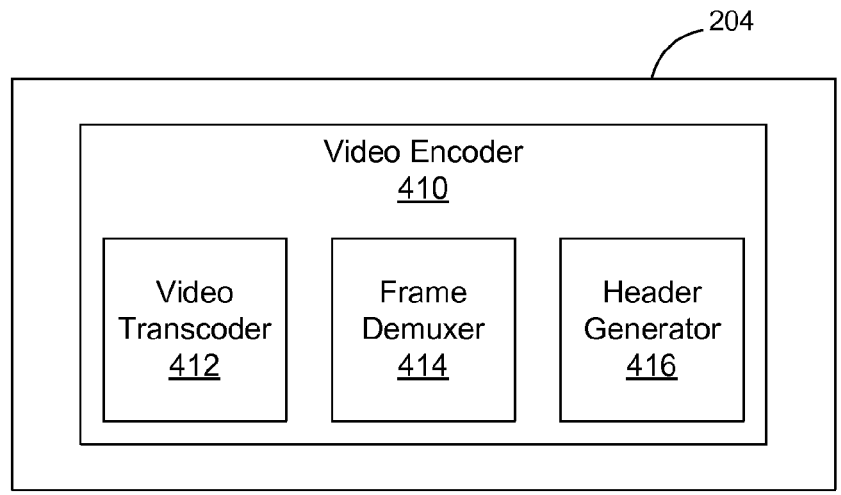
FIG. 4 is a block diagram of an architecture of a video encoder, according to one example embodiment.

FIG. 4 is a block diagram of an architecture of a video encoder 410, according to one example embodiment. As illustrated, the video encoder 410 is stored as instructions in the camera's system memory 204. However, the video encoder 410 may also be implemented using a hardware element (e.g., a logic circuit) included in the microcontroller 202 or I/O port interface 238. The video encoder 410 includes a video transcoder 412, frame demuxer 414, and a header generator 416. The video encoder 410 may be implemented on another storage device such as a docking station 120 or media server 130. In other embodiments, the video encoder 410 may include additional, fewer, or different components for performing the functionalities described herein. For example, the video transcoder 412 is included in a separate module or omitted.

The video transcoder 412 receives a video and transcodes the video into a particular format. The received video may be raw image data captured by the image sensor 212 and/or audio data captured by a microphone 222 in synchrony with the image data, or the received video may already be processed into a video format. The video transcoder 412 outputs video transcoded to a particular video file format (e.g., MPEG-2, MP4), which may include a combination of video coding formats (e.g., H.262, H.264) and/or audio coding formats (e.g., AAC, MP3). Transcoding a video may include compressing a video (e.g., by converting a raw video into groups of pictures with I-, P-, and B-frames), modifying a video's resolution, or modifying the video's frame rate. In particular, the video transcoder 412 typically compresses raw video data to reduce the video's transmission time and/or storage space. A video may be transcoded after capture and stored in the system memory 204, or the video may be transcoded before transmission to a client device 140. The video transcoder 412 may transcode media using hardware (e.g., an ISP (image signal processor) chip), software, or a combination of the two.

The frame demuxer 414 receives a video and converts the video's frames to frame segments. The received video may be a raw video (from the system memory 204) or a transcoded video (from system memory 204 or the video transcoder 412). The frame demuxer 414 divides a frame's image data into frame segments according to a pre-determined encoding protocol. The frame demuxer 414 may determine a minimum number of frame segments by dividing the video frame size by a communication packet's maximum payload size. For example, UDP packets compliant with IPv4 (Internet Protocol version 4) have a maximum payload size of 65,535 bytes, so the frame demuxer 414 segments a 1080p video frame with 3 color channels having a size of about 7.8 MB into at least 119 frame segments for transmission in 119 UDP packets. The frame demuxer 414 may sequentially segment the video frame's data according to the maximum packet size or a packet size determined to equalize the size of the frame segments. A frame segment may include a video frame's image data, audio data synchronized with the video frame, or a combination thereof.

The header generator 416 obtains frame segments and generates segment headers for the frame segments. The segment header for a frame segment may include a frame marking header that facilitates separation of frames by a video decoder. The header generator 416 may include a frame marking header in one, multiple, or all of the segment headers corresponding to a video frame's frame segments. In one embodiment, the header generator 416 obtains the number of frame segments that the frame demuxer 414 has generated for the frame and encodes the number of frame segments as the frame marking header.

Alternatively or additionally, the header generator 416 generates a frame marking header marking a boundary segment. The header generator 416 determines whether a frame segment is a frame boundary segment based on an order of the frame segments within a frame. In some encoding protocols, the last frame segment for a frame is the boundary frame, but in other encoding protocols, a frame's first frame segment is the boundary frame, or both the first and last frame segments are boundary frames. The header generator 416 generates a frame marking header including a flag identifying the corresponding frame segment as a frame boundary segment (e.g., a "first frame segment" or "last frame segment" flag).

The header generator 416 may also generate flags indicating that a frame segment is a group boundary segment within a group of pictures. A group boundary segment is a first frame segment in a group of picture's first frame or a last frame segment in a group of picture's last frame. The header generator 416 may include a flag in the frame marking header indicating that the first and/or last frame segments within the group of pictures are group boundary segments depending on the encoding protocol.

The header generator 416 may also generate segment headers indicating a sequential order of a frame segment among the other frame segments. The header generator 416 determines the sequential order of the frame segment among other frame segments. For example, the header generator 416 maintains a counter of frame segments sequentially generated by the frame demuxer 414 and generates the segment header with an index from the counter. The header generator 416 may generate segment headers that specify the frame segment's relative ordering among other frame segments (or positioning within the frame) using a bit range, row or column range, pixel range, or other data index. In some embodiments, the header generator 416 also includes a frame index within the generated header. The frame index indicates the frame's order relative to other frames.

Under different encoding protocols, the header generator 416 may encode different information in segment headers to facilitate efficient rendering of the video frames. Different encoding protocols may embody different assumptions about reliability of communication packet delivery, as described further with respect to FIG. 5.

Example Client Device Architecture and Video Decoder

Figure 5:
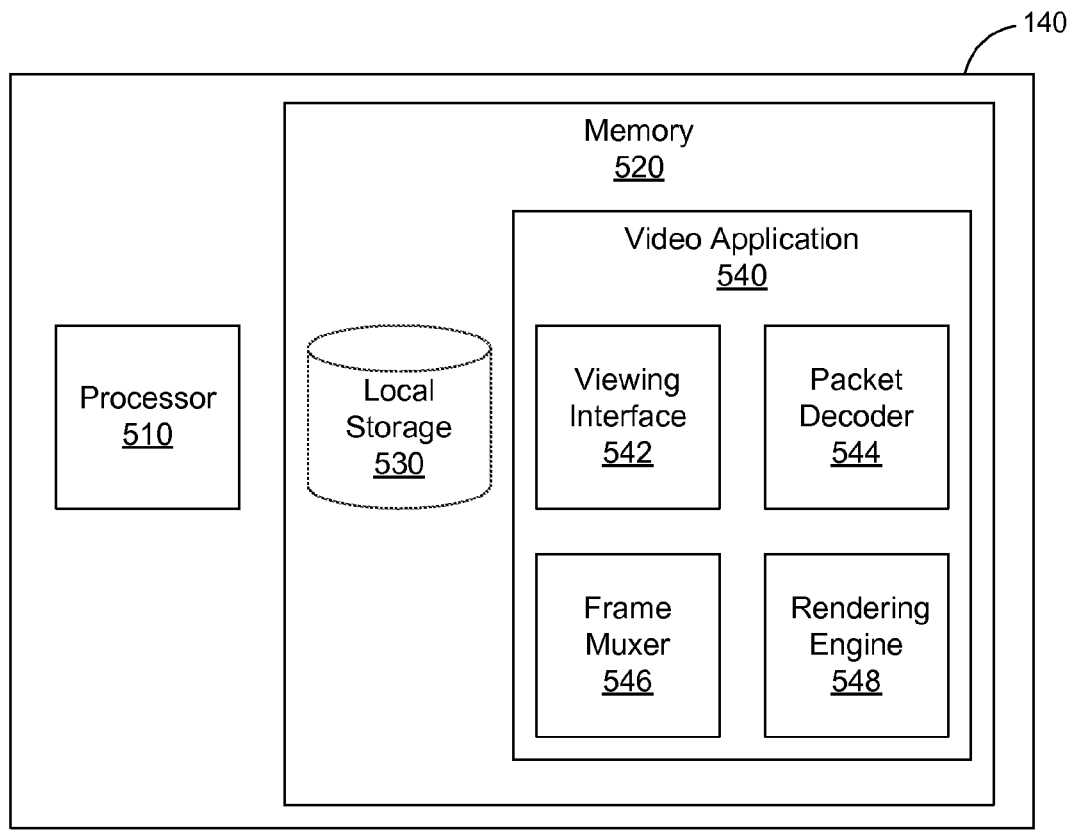
FIG. 5 is a block diagram of an architecture of a client device that may present a streamed video, according to one example embodiment.

FIG. 5 is a block diagram of an architecture of a client device 140 that may present a streamed video, according to one example embodiment. The client device 140 includes a processor 510 and a memory 520. In other embodiments, the client device 140 may include additional, fewer, or different components for performing the functionalities described herein. Conventional components, such as power sources (e.g., batteries, power adapters) and network interfaces (e.g., micro USB port, an Ethernet port, a Wi-Fi antenna, or a Bluetooth antenna, supporting electronic circuitry) are not shown to avoid obscuring details of the system architecture.

The processor 510 includes one or more computational nodes, such as a central processing unit (CPU), a core of a multi-core CPU, a graphics processing unit (GPU), a microcontroller, an application-specific integrated circuit (ASIC), a field programmable gate array (FPGA), or other processing device such as a microcontroller or state machine. The memory 520 includes one or more computer-readable media, including non-volatile memory (e.g., flash memory), and volatile memory (e.g., dynamic random access memory (DRAM)).

The memory 520 stores instructions (e.g., computer program code) executable by the processor 510 to provide the client device functionality described herein. The memory 520 includes instructions for modules including a video application 540 and databases such as local storage 530. In other embodiments, the memory 520 may include additional, fewer, or different components for performing the functionalities described herein.

Local storage 530 may be a database and/or file system of the memory 520. The local storage 530 stores videos, images, recordings, and associated metadata transferred from a storage device such as a camera 110, docking station 120, or media server 130. In one embodiment, a camera 110 is paired with the client device 140 through a network interface (e.g., a port, an antenna) of the client device 140. Upon pairing, the camera 110 sends media stored thereon to the client device 140 (e.g., through a Bluetooth or USB connection), and the client device 140 stores the media in the local storage 530.

In some embodiments, the video application 540 presents a video streamed from a storage device. Streaming a video refers to presenting a video as the video is incrementally received from a storage device, often in the form of communication packets. The video application 540 may begin presenting the streamed video before the entire video is received. As the video is received, the client device 140 stores at least a portion of the video's frames in a video buffer, which may be a queue of video frames about to be presented (e.g., 1 to 10 seconds worth of frames). In some embodiments, the local storage 530 retains a copy of the streamed video, but in other embodiments the streamed video's frames are discarded after they are presented.

The video application 540 includes a viewing interface module 542, a packet decoder 544, a frame muxer 546, and a rendering engine 548. In other embodiments, the video application 540 may include additional, fewer, or different components for performing the functionalities described herein.

The viewing interface module 542 generates a user interface for a user to browse media. The viewing interface module 542 identifies a storage device accessible by the client device 140 and determines which videos on the storage device are accessible by the client device 140. For example, the accessible storage device is a camera 110 or docking station 120 connected to the client device 140 through a local network 150, and all the videos contained thereon are accessible to the client device 140. As another example, the accessible storage device is a media server 130, which allows the client device 140 to access videos based on a user account associated with the client device 140. For instance, the client device 140 can access videos shared with the associated user account through the media server 130 as well as videos posted publicly on the media server 130.

The viewing interface module 542 generates a user interface including previews (e.g., a title, description, and preview image) of the accessible videos. The user may navigate through the previews by specifying a device, an account, a tag (e.g., sport, activity, equipment, location, time of day, time of year), or any other metadata associated with videos.

By interacting with the viewing interface through an input means of the client device 140, the user may select one of the videos for viewing. The viewing interface presents the selected video in a video player. The video application 540 requests the selected video from the relevant storage device and receives communication packets containing portions of the selected video. While the communication packets are received, the video application presents the streamed video by processing the received packets using the packet decoder 544, the frame muxer 546, and the rendering engine 548.

The packet decoder 544 receives a communication packet and decodes the communication packet to obtain a frame segment and a segment header. Once the packet decoder 544 has obtained enough frame segments to render a frame, the packet decoder 544 outputs the frame segments to the frame muxer 546. The packet decoder 544 may separate the segment header and the frame segment according to a format specified by the encoding protocol. For example, the encoding protocol reserves a particular number of bytes for the segment header at the beginning of the communication packet's payload. As another example, the packet decoder 544 identifies the end the segment header from a unique sequence of bits not usable in the remainder of the segment header according to the encoding protocol.

From one or more the segment headers, the packet decoder 544 identifies a frame marking header and determines whether sufficient communication packets have been received to render the corresponding frame. For example, the segment header includes a numerical field specifying the frame marking header as a total number of frame segments or communication packets used to encode the frame. In this case, the packet decoder 544 determines whether the number of communication packets received for the frame equals the total number of frame segments. If the encoding protocol assumes reliable and sequential transmission of communication packets, the packet decoder 544 may identify the frame segments in a frame from the number of communication packets received since receipt of sufficient communication packets to render a frame immediately prior. If the encoding protocol provides for non-sequential transmission of communication packets, the packet decoder 544 may sort frame segments by a frame identifier included in the segment header and compare the number of frame segments for a particular frame to the total number of received packets. If the encoding protocol provides for unreliable communication packet transmission, the packet decoder 544 may determine a threshold number of frame segments sufficient for rendering the frame from a proportion of the total number (e.g., 99%) and compare the number of frame segments to the threshold number instead of the total number of frame segments.

Alternatively or additionally to encoding the total number of frame segments in a frame, the segment header includes a flag indicating whether the corresponding frame segment is a boundary frame segment. The packet decoder 544 determines whether the flag is activated (e.g., true, high), which signifies that the accompanying frame segment is a boundary frame segment, or deactivated (e.g., false, low), which signifies that the accompanying frame segment is not a boundary frame segment. In response to identifying a flag corresponding to the last frame segment in a frame, the packet decoder 544 determines that the sufficient number of frame segments have been received for the current frame. In response to identifying a flag corresponding to the first frame segment in a frame, the packet decoder 544 determines that the sufficient number of frame segments have been received for the previous frame. If the encoding protocol assumes out-of-order communication packet transmission, the packet decoder 544 may pause for a threshold amount of time after identifying the boundary frame. If the encoding protocol assumes unreliable transmission, the header generator 416 may generate multiple segment headers indicating a boundary frame flag (e.g., the last three frames are marked as boundary frames), and the packet decoder 544 determines that the sufficient number of packets have been received in response to identifying at least a threshold number of the boundary frame segments.

The frame muxer 546 receives a set of frame packets corresponding to a video frame and assembles the frame packets into the video frame for output to the rendering engine 548. In some cases, the frame packets include audio captured at substantially the same time as the frame, and the frame muxer 546 combines the frame segments containing the audio with frame segments containing image data. The frame muxer 546 may determine an order of the frame segments according to the encoding protocol. For example, the frame muxer 546 determines the sequential order of the frame segments from the segment headers accompanying the frame segments. As another example, the frame muxer 546 assembles the frame segments in order of reception, which assumes sequential transmission and reception of communication packets. As a third example, the frame muxer 546 determines the sequential order of the frame segments from indexes embedded in the frame segments (e.g., pixel row/column line identifiers).

The rendering engine 548 receives assembled video frames and renders the video frames for presentation in the viewing interface. The rendering engine 548 may render I-frames without reference to other frames. To render a P-frame, the rendering engine 548 applies transformations encoded in the P-frame relative to another (e.g., a previous) I-frame. To render a B-frame, the rendering engine 548 interpolates between two other frames (e.g., an I-frame and a P-frame). The rendering engine 548 renders frames from the beginning of a group of pictures before the entire group of pictures is received. In the example group of pictures 310 illustrated in FIG. 3, I-Frame 320 may be rendered as soon its constituent packets have been received, and P-Frames 340A and 340B may be rendered as long as I-frame 320 has been assembled. B-frames 330A and 330B may rendered once P-frame 340A has been assembled, and B-frames 330C and 330D may be rendered once P-frame 340B has been assembled.

In some embodiments, the rendering engine 548 buffers fewer than the number of pictures in the group of pictures before presenting the video. For example, the rendering engine 548 buffers a threshold proportion of the total number of frames in the group of pictures (e.g., one half to one quarter of the frames in the group of pictures). Once the threshold number or proportion of frames have been received and assembled, the rendering engine 548 renders frames for playback. This approach beneficially reduces latency between a user requesting a video and the beginning of video playback. If the network 150 transmits frames more quickly than the video player presents frames, then the client device 140 may present the video without interruptions even if few video frames are buffered at the beginning of playback.

In one embodiment, the video transcoder 412 generates a video in a format where no frame depends on a subsequently captured frame. The rendering engine 548 may present such a video without any buffering any frames if the rate of frame transmission is consistently greater than the rate of frame playback. In one embodiment, the video transcoder 412 encodes a number of groups of pictures at the beginning of the video without frames that depend on subsequent frames (e.g., without B-frames) and encodes the following groups of pictures with such frames (e.g., with B-frames). Such an encoding scheme enables the rendering engine 548 to begin playback of the video without buffering frames initially. If the rate of video transmission over the network is sufficiently high, then at the time the client device 140 receives communication packets encoding B-frames, the rendering engine 548 will have buffered enough video frames to render the B-frames. Thus, encoding initial groups of pictures without B-frames reduces latency while encoding following groups of pictures with B-frames reduces total video file size relative to a video without any B-frames.

Streaming Requested Media

Figure 6:
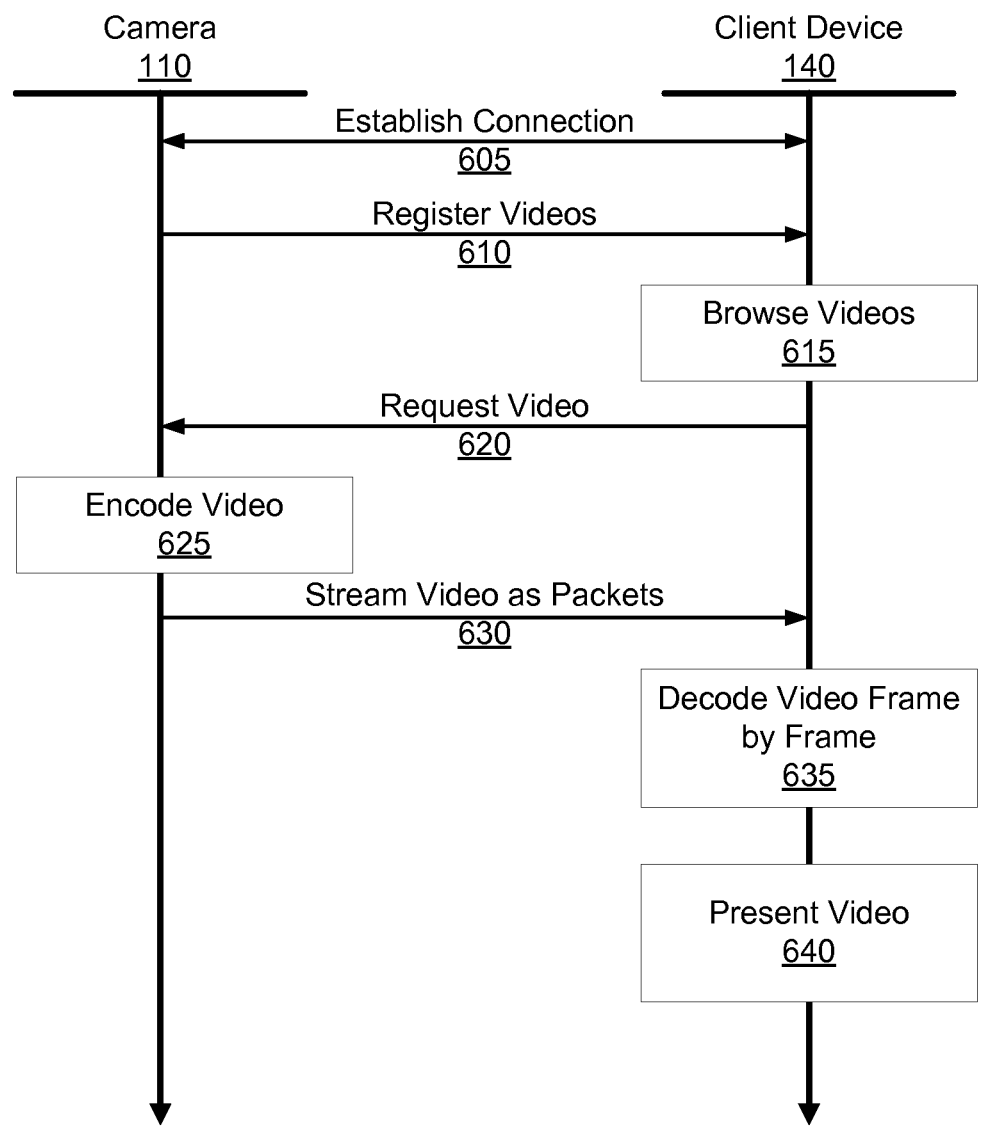
FIG. 6 is an interaction diagram illustrating transmission of a video between a camera and a user device, according to one example embodiment.

FIG. 6 is an interaction diagram illustrating transmission of a video between a camera 110 and a client device 140, according to one example embodiment. The illustrated interactions may also occur between the client device 140 and a media server 130 or docking station 120. Different embodiments may include additional or fewer steps in different order than that described herein.

The camera 110 and client device 140 establish 605 a connection. For example, the client device 140 and camera 110 establish a Bluetooth pairing or WiFi connection. As another example, the client device 140 establishes a wired or wireless connection to the docking station 120 or a remote media server 130. As another example, the client device 140 establishes a connection with another client device 140 that is communicatively coupled to a docking station 120. The camera 110 (or other device that stores videos accessible by the client device 140) registers 610 videos stored thereon with the client device 140. The video application 540 presents a list or preview of the camera's videos for a user to browse 615. The user selects a video through the video application 540, and the client device 140 requests 620 the video from the camera 110 (or other connected device). The video encoder 410 encodes 625 the video into communication packets, as described in further detail with respect to FIG. 7. The camera 110 (or other device storing the requested video) streams 630 the video through the communication packets to the client device 140. The video application 540 decodes 635 the video frame by frame as the communication packets are received, renders the frames, and presents 640 the video, as described in further detail with respect to FIG. 8.

Encoding a Video for Streaming

Figure 7:
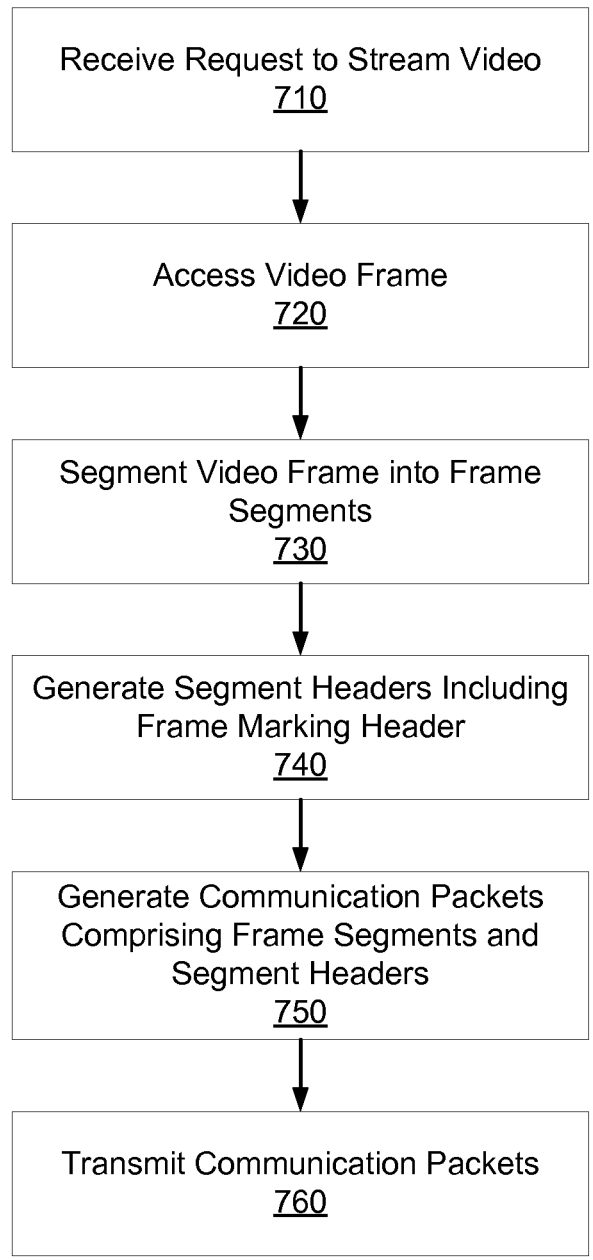
FIG. 7 is a flowchart illustrating encoding and transmitting a video, according to one example embodiment.

FIG. 7 is a flowchart illustrating encoding and transmitting a video, according to one example embodiment. Different embodiments may include additional or fewer steps in different order than that described herein. In some embodiments, a video encoder 410 on a storage device (e.g., camera 110, docking station 120, media server 130) provides the functionality described herein.

The storage device receives 710 a request originating from a client device 140 to stream the video for playback on the client device 140. The storage device accesses 720 the video frames of the requested video. Typically, the stored video has been transcoded (by video transcoder 412) to a compressed format to reduce memory and bandwidth consumption. Alternatively or additionally, the stored video has not been transcoded, but the accessed video may be transcoded prior to being encoded into communication packets.

The frame demuxer 414 segments 730 the video frame into a plurality of frame segments. For example, the number of frame segments is determined based on a maximum size of a communication packet's payload. The header generator 416 generates 740 segment headers indicating a sequence order of the frame segments. The header generator 416 may generate 740 a segment header to accompany each frame segment or may generate 740 segments headers to accompany only a subset of the frame segments. At least one of the segment headers includes a frame marking header that indicates a boundary of the video frame relative to other video frames in the video.

The video encoder 410 generates 750 communication packets having payloads including the generated segment headers corresponding frame segment. For example, a communication packet's payload includes one frame segment and one corresponding segment header, but some communication packets may not include a segment header. The storage device transmits 760 the communication packets to the client device 140 for playback of the video frame. The client device 140 renders the video frame using the frame marking header. The storage device sequentially encodes and transmits the requested video's video frames.

Decoding a Streamed Video

Figure 8:
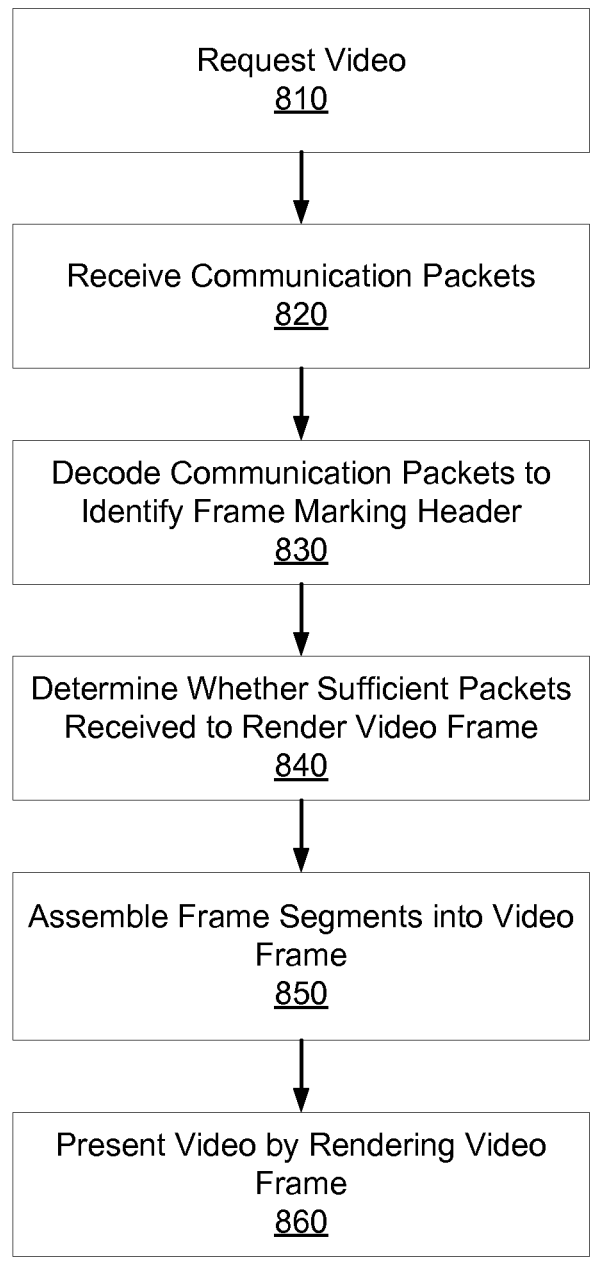
FIG. 8 is a flowchart illustrating decoding and presenting a video, according to one example embodiment.

FIG. 8 is a flowchart illustrating decoding and presenting a video, according to one example embodiment. Different embodiments may include additional or fewer steps in different order than that described herein. In some embodiments, a video application 540 on a client device 140 provides the functionality described herein.

A client device 140 requests 810 a video from a storage device. Although the device receiving the request and the device storing the video are typically the same device, they may be different. For example, a media server 130 receives the request and instructs a server of a content distribution network to transmit the video to the client device 140. The client device 140 receives 820 receives communication packets containing the video.

The packet decoder 544 decodes 830 the communication packets to obtain frame segments corresponding to one or more video frames of the video and segment headers indicating a sequence order of the plurality of frame segments. The packet decoder 544 identifies a frame marking header from the segment headers. The frame marking header indicates a boundary of the video frame relative to other video frames in the video. Example frame marking headers include a number indicating a total number of frame segments used to encode the video frame as well as a flag indicating that the accompanying frame segment is a boundary frame segment (e.g., the first or last frame segment).

Based on the segment headers, the packet decoder 544 determines 840 whether sufficient communication packets have been received to render the video frame. Generally, receiving sufficient communication packets to render a frame refers to receiving all the frame segments corresponding to a frame, but if transmission is unreliable, then receiving sufficient communication packets may refer to receiving a proportion of the frame's frame segments. In response to determining that the sufficient number of communication packets has been received, the frame muxer 546 assembles 850 the video frame from frame segments corresponding to the video frame, and the video application 540 presents 860 at least a portion of the video by rendering the assembled video frame using the rendering engine 548. The client device 140 progressively receives communication packets corresponding to further frames and sequentially presents the frames.

Additional Configuration Considerations

The disclosed embodiments beneficially reduce latency while presenting a streaming video. By providing a video marking header to enable recognition of when a video frame's frame segments have been received, the video application 540 presents a video frame without necessarily receiving all the following video frames in the group of pictures. Although the reduction in latency depends on the resolution, frame rate, and number of frames in a group of pictures, the disclosed embodiments typically reduce latency to begin displaying a video by the time to transmit at least one video frame relative to implementations where the entire group of pictures is received and assembled before beginning video presentation.

Certain embodiments are described herein as including logic or a number of components, modules, or mechanisms, for example, as illustrated in FIGS. 3 and 4. Modules may constitute software modules (e.g., code embodied on a machine-readable medium or in a transmission signal), hardware modules, or a combination thereof. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for encoding, decoding, and presenting videos. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A non-transitory computer-readable medium comprising instructions for streaming a video, the instructions executable by a processor and comprising instructions for:
   receiving, from a client device, a request to stream the video for playback by the client device;
   accessing a video frame from video frames included in the video, the video frame being a last frame in a group of pictures included in the video, the group of pictures comprising an intra-coded video frame and one or more inter-coded video frames;
   segmenting the video frame into a plurality of frame segments;
   identifying a frame boundary segment immediately preceding a frame segment in another group of pictures included in the video;
   generating segment headers indicating a sequence order of the frame segments, the segment headers comprising a frame marking header, the frame marking header indicating a boundary of the video frame relative to other video frames in the video and including a flag identifying the frame boundary segment;

generating communication packets each having a payload comprising one of the segment headers and a corresponding one of the frame segments, the communication packets comprising a communication packet with a payload comprising the frame boundary segment and the frame marking header; and transmitting the communication packets to the client device for playback of the video frame, the client device rendering the video frame using the frame marking header.

2. The computer-readable medium of 1, wherein generating the segment headers comprises:
determining a total number of frame segments included in the frame segments; and
generating the frame marking header specifying the total number of frame segments.

3. The computer-readable medium of 1,
wherein generating the segment headers comprises:
identifying the frame boundary segment at an end of the sequence order of the frame segments.

4. The computer-readable medium of 1, wherein the instructions further comprise instructions for:
generating a subsequent set of communication packets comprising frame segments of a next video frame immediately following the video frame; and
transmitting the subsequent set of communication packets corresponding to the next video frame after transmitting all the communication packets corresponding to the video frame.

5. A camera comprising:
an image sensor;
a processor; and
a non-transitory computer-readable medium comprising instructions for transferring a video captured by the image sensor, the instructions executable by a processor and comprising instructions for:
receiving, from a client device, a request to stream the video for playback by the client device;
accessing a video frame from video frames included in the video, the video frame being a last frame in a group of pictures included in the video, the group of pictures comprising an intra-coded video frame and one or more inter-coded video frames;
segmenting the video frame into a plurality of frame segments;
identifying a frame boundary segment immediately preceding a frame segment in another group of pictures included in the video;
generating segment headers each indicating a sequence order of the frame segments, the segment headers comprising a frame marking header, the frame marking header indicating a boundary of the video frame relative to other video frames in the video and including a flag identifying the frame boundary segment;
generating communication packets each having a payload comprising one of the segment headers and a corresponding one of the frame segments, the communication packets comprising a communication packet with a payload comprising the frame boundary segment and the frame marking header; and
transmitting the communication packets to the client device for playback of the video frame, the client device rendering the video frame using the frame marking header.

6. The camera of claim 5, wherein generating the segment headers comprises:
determining a total number of frame segments included in the frame segments; and
generating the frame marking header specifying the total number of frame segments.

7. The camera of claim 5,
wherein generating the segment headers comprises:
identifying the frame boundary segment at an end of the sequence order of the frame segments.

8. The camera of claim 5, wherein the instructions further comprise instructions for:
generating a subsequent set of communication packets comprising frame segments of a next video frame immediately following the video frame; and
transmitting the subsequent set of communication packets corresponding to the next video frame after transmitting all the communication packets corresponding to the video frame.

\* \* \* \* \*